(12) United States Patent
Karpovich et al.

(10) Patent No.: US 7,587,362 B2
(45) Date of Patent: Sep. 8, 2009

(54) DATA PROCESSING SYSTEM FOR MANAGING AND PROCESSING FOREIGN EXCHANGE TRANSACTIONS

(75) Inventors: Ronald Joseph Karpovich, London (GB); Martin John Spurr, Wrabnais (GB)

(73) Assignee: Royal Bank of Scotland PLC, London (GB)

( * ) Notice: Subject to any disclaimer, the term of this patent is extended or adjusted under 35 U.S.C. 154(b) by 778 days.

(21) Appl. No.: 10/492,104

(22) PCT Filed: Jan. 17, 2002

(86) PCT No.: PCT/GB02/00191

§ 371 (c)(1),
(2), (4) Date: Oct. 1, 2004

(87) PCT Pub. No.: WO03/034296

PCT Pub. Date: Apr. 24, 2003

(65) Prior Publication Data

US 2005/0021454 A1    Jan. 27, 2005

(30) Foreign Application Priority Data

Oct. 12, 2001    (GB) .................................. 0124587.7

(51) Int. Cl.
*G06Q 40/00*    (2006.01)
(52) U.S. Cl. ......................................... 705/39; 705/35
(58) Field of Classification Search .............. 705/10–44
See application file for complete search history.

(56) References Cited

U.S. PATENT DOCUMENTS

| | | | |
|---|---|---|---|
| 5,943,655 A * | 8/1999 | Jacobson ...................... 705/30 |
| 6,332,133 B1 * | 12/2001 | Takayama .................... 705/39 |
| 6,598,028 B1 * | 7/2003 | Sullivan et al. ........... 705/36 R |
| 7,024,383 B1 * | 4/2006 | Mancini et al. ............... 705/35 |
| 7,194,481 B1 * | 3/2007 | Van Roon ................ 707/104.1 |

OTHER PUBLICATIONS

Ojala, Marydee, "Databases for foreign exchange", Database v18n3, pp. 81-83, Jun./Jul. 1995, ISSN:0162-4105, dialog file 15, Accession No. 01050719.*
"First Rate Exchange Services Ltd:, Yuan winners First Rate refeals 120 per cent increase in Olympic currency sales", Aug. 22, 2008, Dialog file 20, Accession No. 66312268.*

* cited by examiner

*Primary Examiner*—Frantzy Poinvil
(74) *Attorney, Agent, or Firm*—Ballard Spahr Andrews & Ingersoll, LLP

(57) ABSTRACT

Data processing systems for international commerce, and in particular relates to cross border transactions in which a foreign exchange transaction is required to settle payment for goods or services. The invention finds particular application in relation to large numbers of low value transactions.

14 Claims, 4 Drawing Sheets

RATE DISTRIBUTION

SCHEME RATE CALCULATION AND DISTRIBUTION

TRANSACTION RECEIPT

WHOLESALE TRANSACTION AGGREGATION

RETAIL TRANSACTION SETTLEMENT

DATA PROCESSING SYSTEM FOR MANAGING AND PROCESSING FOREIGN EXCHANGE TRANSACTIONS

CROSS REFERENCE TO RELATED APPLICATIONS

The present application claims priority to and the benefit of the filing date of Great Britain Application No. 0124587.7, filed Oct. 12, 2001, which application is incorporated herein fully by this reference.

FIELD OF THE INVENTION

The present invention relates to the field of data processing systems for international commerce, and in particular relates to cross boarder transactions in which a foreign exchange transaction is required to settle payment for goods or services. The invention finds particular application in relation to large numbers of low value transactions.

BACKGROUND

Internet electronic commerce developments have fuelled the need for foreign exchange transactions involving small sums for a number of markets, including retail markets. Websites provide an opportunity for world wide marketing of products. These may be selected and purchased online, often from a retailer or other business based in a country foreign to the customer. In retail transactions purchasing is often carried out by means of a credit or debit card transaction. The customer sees a price for a product on a foreign website expressed in a foreign currency, and the customer purchases the goods by providing credit card details to the website. The credit card scheme, acting on behalf of both the card issuer and the merchant acquirer carries out a foreign exchange transaction as part of the purchase, in order to arrive at a figure in the customer's home currency for the foreign currency purchase. This home currency amount is then applied to the customer's credit card or debit card account by the card issuing financial institution.

The customer does not actually know what the charge in the home currency will be at the time of purchase. He/she simply waits until it appears on his/her credit card statement. Naturally he/she could estimate what the exchange rate applied may be; for example with reference to published tourist rates, or on the basis of past experience.

The foreign exchange transaction generates a significant income stream for the credit card-issuing bank. This is because the bank applies a retail foreign exchange rate to the customer's transaction, but can itself rely upon a wholesale foreign exchange rate which the bank obtains in processing a transaction.

The bank, but not the customer, may be able to take advantage of the wholesale foreign exchange markets by agglomerating a plurality of individual foreign exchange transactions of the type described above into a wholesale transaction. The effect to the bank may be a further profit arising from the difference between the retail foreign exchange rate offered to the customer and the wholesale rate available to the bank. In the case of a credit card transaction this is in addition to the profit generated by the offering of credit to the customer in the normal manner of a credit card.

Of course, trans-border transactions are not limited to retail credit and debit card payments. Other payment methods may be used, such as direct currency transfer from one bank account to another foreign bank account. Typically however a foreign exchange transaction is conducted in the home country of the customer and the payment is transferred in the appropriate foreign currency.

A problem with this mechanism is that where a transaction involves relatively low value payments, the customer will not be able to access wholesale foreign exchange rates, which will usually only be available on very large value transactions. Hence low value foreign exchange transactions are typically inefficient, and act as a constraint to cross border trade. This is particularly true of the Internet market, which provides a ready mechanism for cross border transactions such as retail sales, foreign share dealing, fund transfers etc.

Cross border foreign exchange transactions are not limited to e-commerce, and the present invention seeks to improve the efficiency of any transaction involving the purchase by a customer in one currency of goods or services offered in another currency, in which the supplier is to be paid in its home currency.

Current transaction processes penalise the payee by transferring the foreign exchange cost burden to the payee. In the example of a credit card purchase, the customer obtains a relatively unfavourable exchange rate, and may not know the actual foreign exchange rate which will be applied, and therefore the actual cost of the goods or service he/purchases until the transaction appears on a statement of account. He/she could of course contact their bank to ask for the instantaneous exchange rate, but this requires him/her to go to the effort of making contact, and in addition conducting a calculation to obtain the actual cost. For low value transactions the consumer is most unlikely to bother, and simply puts up with the inconvenience of not seeing the actual cost.

Trans-border payments involving foreign exchange are often made by credit card. In effecting any credit card payment there are two distinct elements to a payment; issue and acquisition. The credit/debit card industry is divided along two distinct lines. These are card issuing and card acquiring. Cards are available under different "schemes", such as Visa, Mastercard, American Express (all trade names). Each of these schemes imposes rules which ensure the acceptability of the cards by all parties.

Card issuing is undertaken by a wide range of banks and non-bank entities. The Card issuers issue cards to the cardholder and have responsibility for providing credit, payment and accounting services. For example Royal Bank of Scotland (trade name) issues cards under the Mastercard scheme.

Merchant acquirers provide the merchants who sell products and services with the infrastructure for accepting card based payments. Merchant acquisition is a highly commoditised business that is dominated by a small number of global providers. For example RBS Card Services is one of the the largest multi-currency global merchant acquirers. It has the capability to accept card transactions in any foreign currency for settlement in about 25 different currencies according to the needs of individual merchants.

Currently the management of foreign exchange currency exposure is based upon exchange rates quoted by the various card schemes through which settlement is managed. Typically currency exchange rates which are three days old are used to settle transactions. This has in the past not been too much of a problem to the merchant acquirers as the margins applied to the transactions are high and capable of absorbing fluctuations over that time period. However, as the volume of transactions has increased the benefits of a more efficient system have become apparent.

Another area where foreign exchange transactions commonly take place is the electronic transfer of money by individuals in one country to persons in another country. Migrant workers may work in one country to support a family in another country. Currently an exchange rate transaction is carried out by the money wirer on the individual sum transferred, so that the money reaches the foreign destination having already been exchanged into the appropriate foreign currency. Payment may be made to the wiring agent by cash or card, but the foreign exchange transaction is conducted by the wiring agent. This may be at an unfavourable rate, and may also be subject to a fixed surcharge.

Other foreign exchange transactions may be manually conducted, involving for physical foreign exchange instruments, such as cash or cheques. This is slow and also acts as a brake on foreign exchange transactions.

SUMMARY

The present invention seeks to provide a data processing system capable of managing foreign exchange transactions in a manner which improves efficiency, so that transactions may be conducted at lower costs per transaction.

According to one aspect of the present invention there is provided a digital data processing system for managing foreign currency exchange transactions, which system includes:
 a core data processing system,
 client data communication means permitting communication between the core system and a plurality of satellite client systems, each of which clients is a source of foreign exchange transactions,
 rate provider data communication means permitting communication between the core system and at least one system which is associated with a provider of wholesale foreign exchange rates,
 settlement data communication means permitting communication between the core system and one or more settlement banks hosting foreign currency accounts for the core system,
 wherein the core system is provided with software implementing the following features:
 means for periodically obtaining from the rate provider wholesale foreign exchange rates,
 means for modifying the wholesale foreign rates to provide client foreign exchange rates,
 means for communicating the client foreign exchange rates to the clients' systems whereby the client may quote prices in foreign currencies,
 means for logging a plurality of foreign exchange transactions provided by the clients,
 means for collating the transactions received into common currency pairs from multiple clients and accumulating the transactions by common pairs, thereby to produce for each currency pair a single aggregated foreign exchange transaction,
 a wholesale settlement engine providing a wholesale transaction settlement function in which aggregated transactions are settled with the relevant rate provider,
 a retail settlement engine in which instructions are given to make appropriate payments to client bank accounts whereby the individual transactions are settled.

Preferably the client data communication means permits real-time communication, whereby transactions may be continuously received. "Real time" communication means that transactions are received without batching of transactions into groups, although batching may occur over short time periods.

In a preferred arrangement, the means for modifying the wholesale foreign rates to provide client foreign exchange rates is adapted to modify rates on a client by client basis, so that each client obtains an individual rate. In this way margins may be tailored according to the volume and type of transactions each client provides. Hence, the individual rates may be calculated having regard to data representative of previous transaction characteristics, whereby a modified rate appropriate to the amount and character of transactions provided by the client is calculated.

In preferred arrangements, the means for collating the transactions received is adapted to accumulate and aggregate transactions on a client by client basis, so that an aggregate position in each relevant currency pair is developed and maintained for each client.

Preferably the means for collating the transactions received includes a netting engine for netting the aggregate positions developed for each client, thereby to develop an overall net position in each relevant currency pair. The netting allows the system efficiently to manage the currency pair positions and minimise the foreign exchange settlement activity required by offsetting a short position in a particular currency pair from one client against a long position in that currency pair from another client.

In another aspect of the invention, the settlement engine includes an algorithm for automatically instructing the execution of a foreign exchange transaction corresponding to the net position in a currency pair when the net position for that currency pair reaches a predetermined level and/or a foreign exchange rate communicated by a rate provider is optimal. In this way the system can react to instantaneous market conditions in order execute a net position wholesale trade when the conditions are favourable.

Although the system is capable of operating with rates from a single rate provider, in a preferred embodiment there are a plurality of rate providers, and the algorithm selects a rate provider offering an optimum rate for execution of the net position transaction. Beneficially, the client positions and net position in each relevant currency pair are maintained on a real time basis so that execution may be instructed at any time.

The client foreign exchange rate is produced by modifying the wholesale rate by applying a margin. In another aspect there are a plurality of rate providers and, for each currency pair, the wholesale exchange rate used in the modifying process is a calculated rate which represents a blend of a plurality of wholesale rates provided for the currency pair.

The present invention will find wide application. For example a client may be one or more credit card or debit card schemes, and the transactions communicated by that client are retail trans-border transactions. Alternatively—or in addition—a client may be a provider of online share dealing, and the transactions are linked to trans-border share purchases. A client may be a provider of foreign currency wiring services. A client may be a provider procurement agent, and the client provides a plurality of transactions relating to the procurement of goods or services for a company.

The present invention is particularly suitable for providing a mechanism for foreign currency exchange for small transactions at highly efficient processing costs and exchange rates which are considerably less than traditional retail rates, and closer to wholesale rates. This provides a potential benefit to both the consumer and retailer, as well as providing a source of profit to the provider of the system.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Certain more detailed, although not necessarily limiting, aspects of how the system functions are explained in the following.

Figure 3:
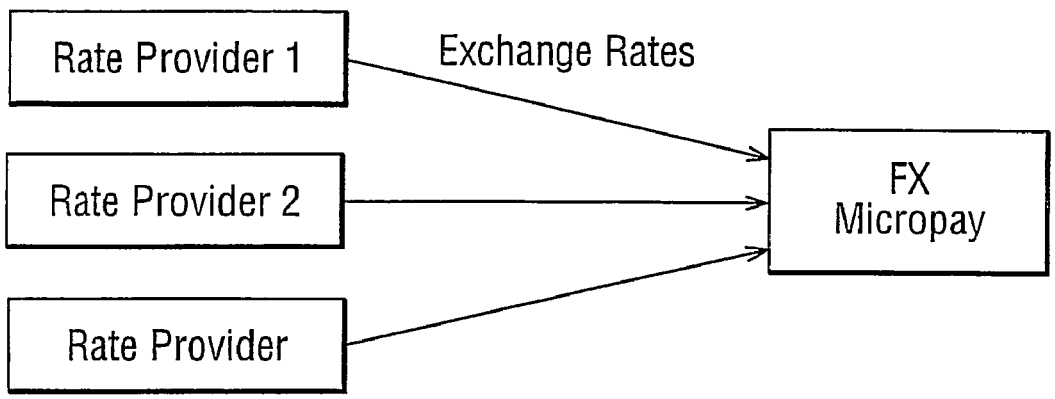
FIG. 3 illustrates exemplary wholesale rate distribution.

Wholesale Rate Distribution—see FIG. 3

The system according to the invention should be capable of obtaining wholesale exchange rates in all currency pairs. The system may obtain rates from a sole rate provider, or may obtain multiple rates from several rate providers. In the case of multiple rate providers, a provider may be chosen on the basis of various factors, including the staleness and tolerance of the rate provided.

Figure 4:
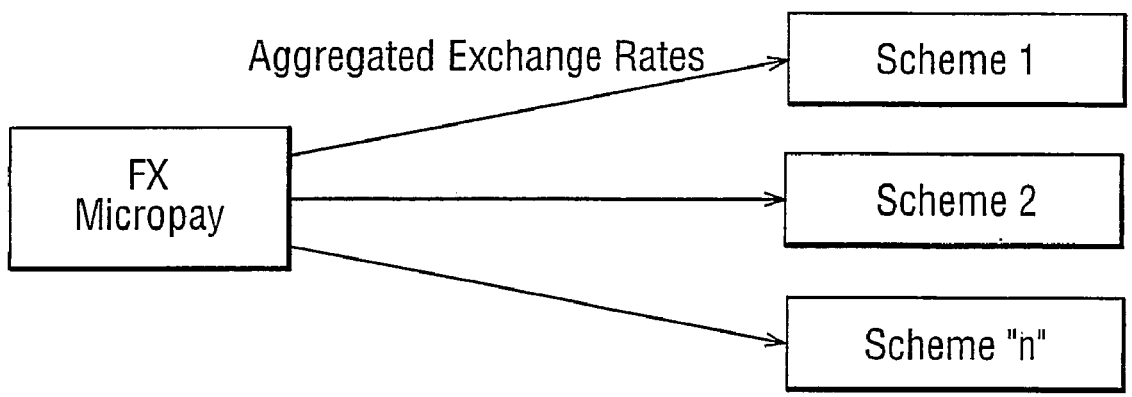
FIG. 4 illustrates exemplary client rate calculation and distribution.

Client Rate Calculation and Distribution—see FIG. 4

Before rates are distributed to the clients (or schemes) a percentage margin is typically added. Hence the client rate corresponds to the wholesale rate plus a margin.

Where the client provides a rate for another party, for example a retailer, the client may apply its own margin to give a retailer rate. The margin applied may vary according to the size of retailer transactions or volume of transactions.

Once the system has calculated a full range of client rates for the currency pairs, the client rates may be distributed to the clients via the data communication means.

The cycle of rate calculation and distribution may be repeated from scheme to scheme.

Figure 5:
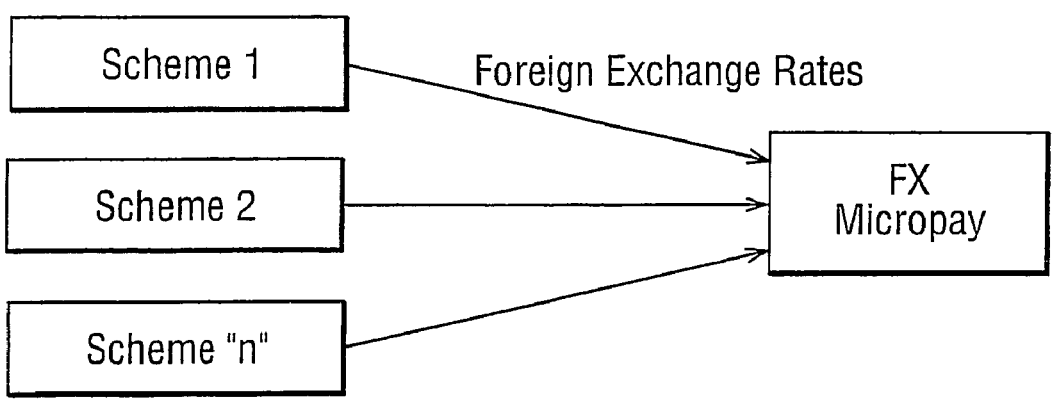
FIG. 5 illustrates an exemplary transaction receipt.

Transaction Receipt—see FIG. 5

The scheme will continuously receive foreign exchange transactions from all of the clients in real time. The transactions will all be buffered (logged and accumulated) to produce an aggregated transaction.

Figure 6:
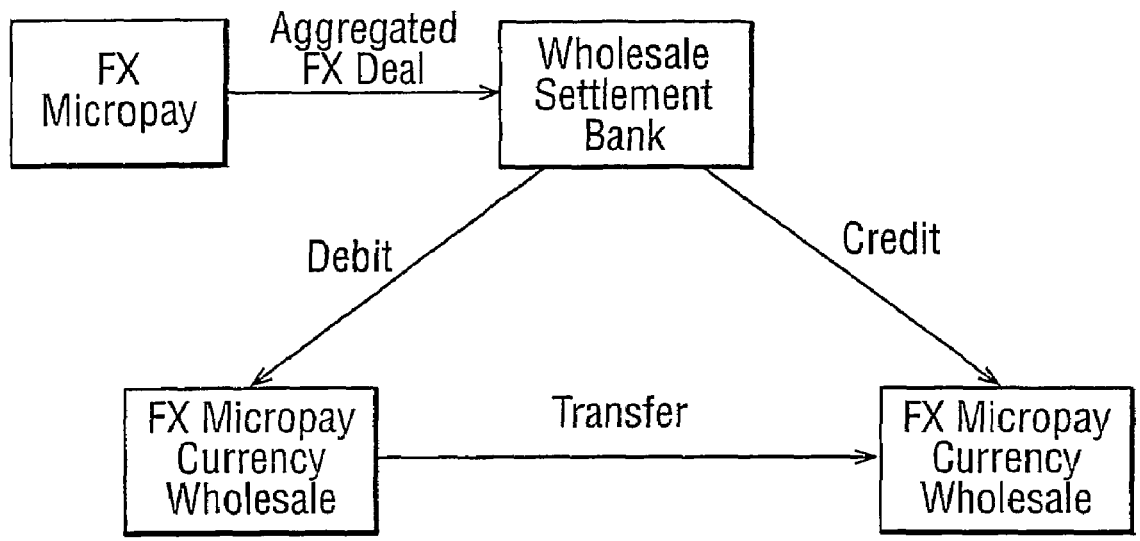
FIG. 6 illustrates an exemplary wholesale transaction aggregation.

Wholesale Transaction Aggregation—see FIG. 6

The system will be provided with an account for each foreign currency in respect of which transactions may be made. The account will be with an appropriate settlement bank. As a result of the continuously arriving transaction packets, the position of each currency held by the system will typically fluctuate between long and short positions. A decision may be made to settle an instantaneous decision, based upon predetermined criteria such as currency amounts, exchange rates, rate trends. Thus settlement trades may be made automatically by specifying a threshold criterion or criteria at or beyond which settlement is made. Alternatively, or in parallel, settlement may be by manual instruction or override.

Figure 7:
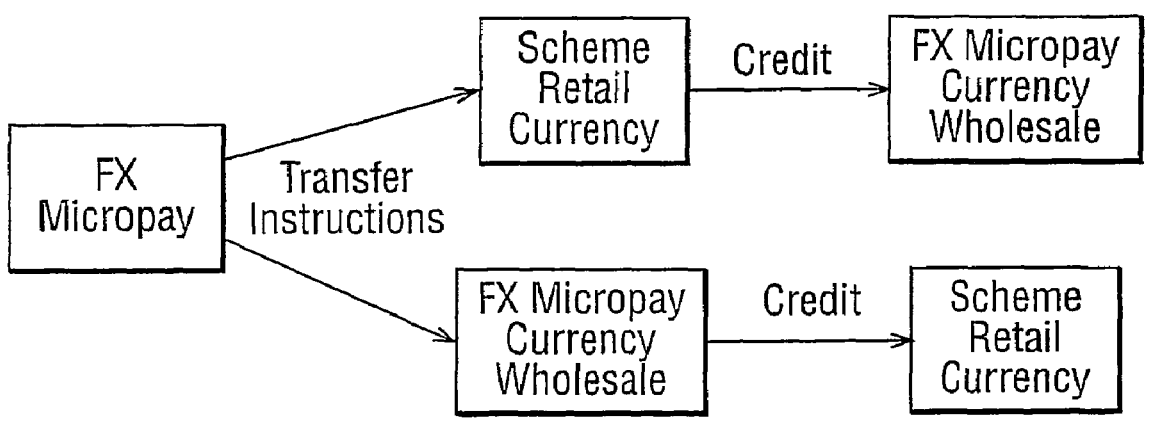
FIG. 7 illustrates an exemplary individual transaction settlement.

Individual Transaction Settlement—see FIG. 7

In order to facilitate the settlement of each of the transactions, each client will typically be provided with a bank account for each different currency in which it trades. Once the system's wholesale currency accounts have sufficient sums from the wholesale settlements, then the system will execute the individual client settlements. By the end of the day (or whenever retail settlements are to take place) the system will have registered a long or short position for each client's transaction currency and will execute a series of transfers between the retail accounts and the wholesale accounts to settle the positions. A long position in a particular currency will result in the transfer of funds from the client's currency account to the system's wholesale account. Conversely, a short position in a particular currency will result in the transfer of funds from the system's wholesale currency account to the client's currency account.

Following is a description by way of example only and with reference to the figures of the drawings of one method of putting the present invention into effect.

Figure 1:
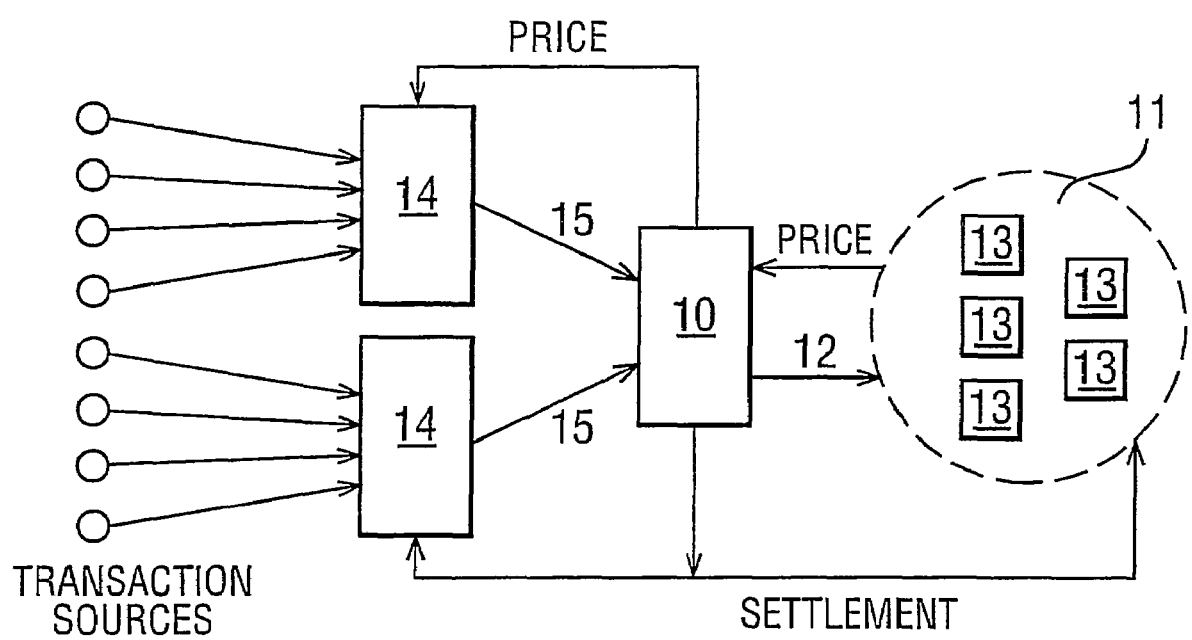
FIG. 1 illustrates an exemplary system.

In the drawings:

FIG. 1 is a schematic diagram showing how a system according to an embodiment of the present invention relates to client systems and rate provider systems.

Figure 2:
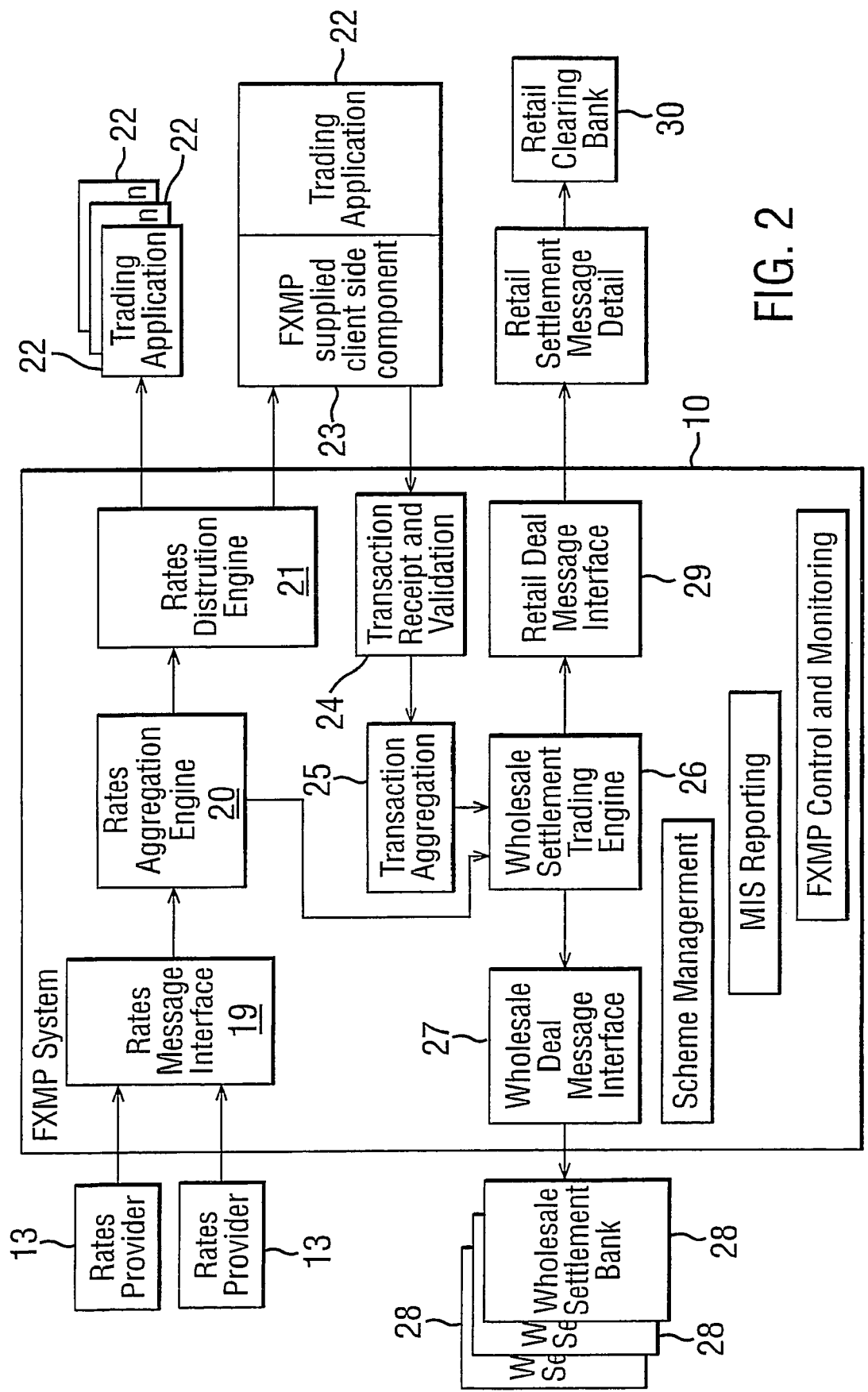
FIG. 2 illustrates another exemplary system.

FIG. 2 is a schematic diagram which is a flow chart demonstrating functional aspects of the system according to the present invention.

FIGS. 3 to 7 are schematic representations of certain generalised elements of the system according to the invention.

The present invention may be implemented by software designed to run on data processing systems and networks. The production of suitable software may be regarded as routine to the person skilled in the art of programming for the electronic implementation of financial and business transactions. Hence the code required is not described in detail in this patent application.

Preferred Embodiment

The present embodiment concerns a system shown schematically in FIGS. 1 and 2. In FIG. 2 a core digital data processing system is shown as 10. This system is in digital data communication with the wholesale foreign exchange markets 11. Digital data communication between the core system 10 and the foreign exchange markets may be provided by means of dedicated networks 12, including conventional wire networks or fibre optic networks. Alternatively the communication may be by means of the pre-existing data networks 12, such as the telephone network, including for example modem based and ISDN type networking. The foreign exchange market comprises a plurality of rate providers 13, which may typically be banks, but which may also be any financial institution capable of providing wholesale foreign exchange rates. Each of the rate providers has its own digital data processing system through which rates may be generated and then made available to the core data processing system by data transfer via the data network.

The core system is also in digital data communication with a plurality of client systems 14. As with the digital data communication between the rate providers and the core system, dedicated or pre-existing data networks 15 may be used to enable data communication between the client systems and the core system. The client systems are sources of data corresponding to foreign exchange transactions. These transactions may arise from several sources, depending upon the business of the client.

The client may be an Internet-based retailer and the transactions may be retail transactions involving trans-border purchases which involve foreign currency exchange (i.e. exchange between a currency pair, for example US Dollars to GB Pounds).

The client may be a money wiring service in which money in one country is "wired" to another country. These transactions are frequently generated by workers who work in one country to support a family in another country or businesses making payments for goods and services received from overseas.

The client may be an Internet-based payment secure mechanism provider, used by a plurality of Internet-based goods/service providers and customer subscribers who need to make payments to the providers. Various systems exist in the Internet market place, and may be targeted at the business to business market, or person to person, or person to business markets. These will generate significant volumes of foreign exchange transactions where trans-border transactions are taking place.

The client may be a credit card scheme, in which credit card payments in a home currency of a purchaser are made to retailers who require payment in a foreign currency.

The types of client are unlimited, provided that the client is capable of providing significant volumes of foreign exchange transactions. The clients who will most benefit from the system of the present invention are those which generate large volumes of low value transactions, although other clients who would not normally be able to access wholesale foreign exchange rates will benefit.

The detailed functions conducted by the core system are shown in FIG. 2. The core system 10 has a rates message interface 19 for periodically obtaining from the rate provider wholesale foreign exchange rates from rate providers 13. The rate providers typically provide rates across wide range of currency pairs, although the rate providers may choose to limit the rates provided to a limited range of currency pairs. However, by obtaining rates from a range of providers it is possible to obtain rates for all currency pairs likely to be the subject of significant volumes of transactions. The frequency with which the wholesale rates are periodically obtained will depend upon the volatility of the market, and may vary from currency pair to currency pair, but may for example be every hour. The system is able to specify the rate provider per scheme and/or currency pair.

The core system has a rate blending 20 engine which, for each currency pair, calculates the degree in variation between rates from provider to provider, and issues a blended rate which is representative of the state of the market, and serves as a predicted rate. The predicted rate is used as the basis for rates communicated to the clients, for the purposes of calculating the foreign exchange rates which will be applied to the transactions corresponding to the client during a given time period (until the next wholesale rate update and rate blend is carried out).

The blended rates are modified to provide client foreign exchange rates. This modification is conducted on a client by client basis, so that account may be taken of the numbers of transactions, size of transactions and nature of transactions (i.e. which currency pairs are usually involved), any credit risk involved in trading with the client, and gross profit margin to be applied. Hence a tailored rate is made available for each currency pair to each client. The modified rates are then distributed to clients by a rates distribution engine 21. The distribution engine may distribute direct to a client trading application 22, or via a dedicated interface 23. The client is then able to use these rates to quote prices for goods and services in a range of foreign currencies, or to allow subscribers to the client to do the same. By quoting prices in foreign currencies, and accepting payment in foreign currencies, the client will generate a significant number of transactions involving foreign currency exchange. The customers of the clients will also be given exact prices for goods or services, without having to estimate separately exchange rates, or rely upon inefficient retail exchange rates.

Foreign exchange transactions are continuously communicated from the clients to the core system via a transaction receipt and validation function 24. For each client, a transaction aggregation engine 25 aggregates transactions currency pair by currency pair. The aggregated individual client positions for each client are then netted across all clients by a wholesale settlement engine 26. This generates a net position in each currency pair. In this way long positions in one currency pair from one client may be offset against short positions in the same currency pair from another client. In this way the system continuously calculates and updates an instantaneous position in each currency pair. Because of the netting which occurs, frequently a client positions (or portions of positions) may be effectively settled internally, providing an income stream for the system.

In parallel with the currency pair position calculations described above, the wholesale settlement engine 26 frequently obtains rates from the rate providers (via the rate aggregation engine 20) for relevant currency pairs. Once a threshold level has been reached in a currency position to make a wholesale trade feasible, the best wholesale rate is selected from the rate providers, and the system instructs execution of a wholesale settlement trade via a wholesale settlement trading engine 27. The engine instructs settlement with a wholesale settlement bank 28 associated with the best rate provider, thereby to settle the position in that currency pair. In this way the system takes advantage of the best wholesale rate, which is likely to be better than the blended rates provided to clients, thereby to generate a system profit.

In parallel with the wholesale settlement, the wholesale settlement engine communicates with a retail deal message interface 29. The deal interface 29 provides a client settlement function in which instructions are given to make appropriate payments to client bank accounts 30 whereby the individual client positions are settled. In order to conduct the client settlement, the core system maintains a plurality of bank accounts in each currency. In this way the client may be paid in its home currency, no matter where the client is based.

The present invention is particularly suitable for providing a mechanism for foreign currency exchange especially suited (but not limited) to large volumes of small value transactions at highly efficient processing costs and exchange rates. Because of the system efficiencies involved in aggregating and netting, and obtaining wholesale rates, the system of the invention provides a remarkable potential benefit to both consumers and retailers, as well as providing a source of profit to the provider of the system.

The invention claimed is:

1. A digital data processing system for managing foreign currency exchange transactions, which system includes:
   a core data processing system,
   client data communication means permitting communication between the core system and a plurality of satellite client systems, each of which clients is a source of foreign exchange transactions,
   rate provider data communication means permitting communication between the core system and a plurality of systems, each of which is associated with a provider of wholesale foreign exchange rates,
   settlement data communication means permitting communication between the core system and one or more settlement banks hosting foreign currency accounts for the core system,
   wherein the core system is provided with software implementing the following features:
      means for periodically obtaining from the rate providers wholesale foreign exchange rates, means for modifying the wholesale foreign exchange rates to provide client foreign exchange rates, wherein each wholesale foreign exchange rate comprises at least one currency pair and the modification comprises blending a plurality of wholesale rates into the client foreign exchange rate, means for communicating the client foreign exchange rates to the clients' systems whereby the client may quote prices in foreign currencies, means for logging a plurality of foreign exchange transactions provided by the clients, means for collating the transactions received into common currency pairs and accumulating the transactions by common pairs, thereby to produce for each currency pair a single aggregated foreign exchange transaction, a wholesale settlement engine providing a wholesale transaction settlement function in which aggregated transactions are settled with the relevant rate provider, a retail settlement engine in which instructions are given to make appropriate payments to client bank accounts whereby the individual transactions are settled.

2. A digital data processing system as claimed in claim 1 wherein the client data communication means permits real-time communication, whereby transactions may be continuously received.

3. A digital data processing system as claimed in claim 1 wherein the means for modifying the wholesale foreign exchange rates to provide client foreign exchange rates, is adapted to modify rates on a client-by client basis, so each client obtains an individual rate.

4. A digital data processing system as claimed in claim 3 wherein the individual rates are provided with reference data representative of previous transaction characteristics, whereby a rate appropriate to the amount and character of transactions provided by the client is calculated.

5. A digital data processing system as claimed in claim 1 wherein the means for collating the transactions received is adapted to accumulate and aggregate transactions on a client by client basis, so that an aggregate position in each relevant currency pair is developed and maintained for each client.

6. A digital data processing system as claimed in claim 5 wherein the means for collating the transactions received includes a netting engine for netting the aggregate positions developed for each client, thereby to develop an overall net position in each relevant currency pair.

7. A digital data processing system as claimed in claim 6 wherein the settlement engine includes an algorithm for automatically instructing the execution of a foreign exchange transaction corresponding to the net position in a currency pair when the net position for that currency pair reaches a predetermined level and/or a foreign exchange rate communicated by a rate provider is optimal.

8. A digital data processing system as claimed in claim 7 wherein there are a plurality of rate providers, and the algorithm selects a rate provider offering an optimum rate for execution of the net position transaction.

9. A digital data processing system as claimed in claim 6 wherein the client positions and net position in any each relevant currency are maintained on a real time basis so that execution may be instructed at any time.

10. A digital data processing system as claimed in claim 1 wherein the client foreign exchange rate is produced by modifying the wholesale rate by applying a margin.

11. A digital data processing system as claimed in claim 1 wherein a client is one or more credit card or debit card schemes, and the transactions communicated by that client are retail trans-border transactions.

12. A digital data processing system as claimed in claim 1 wherein a client is a provider of online share dealing, and the transactions are trans-border share purchases.

13. A digital data processing system as claimed in claim 1 wherein a client is a provider of foreign currency wiring services.

14. A digital data processing system as claimed in claim 1 wherein a client is a provider procurement agent, and the client provides a plurality of transactions relating to the procurement of goods or services for a company.

* * * * *